United States Patent
Iwamura

(10) Patent No.: US 6,907,910 B2
(45) Date of Patent: Jun. 21, 2005

(54) PNEUMATIC TIRE INCLUDING SIPES

(75) Inventor: Wako Iwamura, Kobe (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 97 days.

(21) Appl. No.: 10/197,489

(22) Filed: Jul. 18, 2002

(65) Prior Publication Data
US 2003/0029537 A1 Feb. 13, 2003

(30) Foreign Application Priority Data
Jul. 18, 2001 (JP) ........................................ 2001-218490

(51) Int. Cl.⁷ .............................................. B60C 11/12
(52) U.S. Cl. ........................ 152/209.18; 152/209.21; 152/209.23; 152/DIG. 3
(58) Field of Search ................... 152/209.18, 209.21, 152/209.23, DIG. 3

(56) References Cited

U.S. PATENT DOCUMENTS

| | | | | |
|---|---|---|---|---|
| 4,566,514 A | * | 1/1986 | Mauk et al. ........... | 152/DIG. 3 |
| 5,350,001 A | * | 9/1994 | Beckmann et al. ..... | 152/DIG. 3 |
| 5,783,002 A | * | 7/1998 | Lagnier .................. | 152/DIG. 3 |
| 6,026,875 A | | 2/2000 | Diensthuber et al. | |
| 6,564,840 B2 | * | 5/2003 | Kleinhoff et al. ....... | 152/DIG. 3 |
| 6,719,024 B2 | * | 4/2004 | Kuze ...................... | 152/DIG. 3 |

FOREIGN PATENT DOCUMENTS

EP 0 864 448 A2 9/1998
JP 2002-321509 A 11/2002

* cited by examiner

Primary Examiner—Steven D. Maki
(74) Attorney, Agent, or Firm—Birch, Stewart, Kolasch & Birch, LLP

(57) ABSTRACT

A pneumatic tire comprises a tread portion comprising tread elements each provided with a sipe, the sipe having an open top end and a bottom, and in a range from the open top to a certain depth, a configuration of the sipe in a plane parallel with the tread face comprising a zigzag part oscillating in the longitudinal direction of the sipe in the course from the open top to said certain depth.

10 Claims, 3 Drawing Sheets

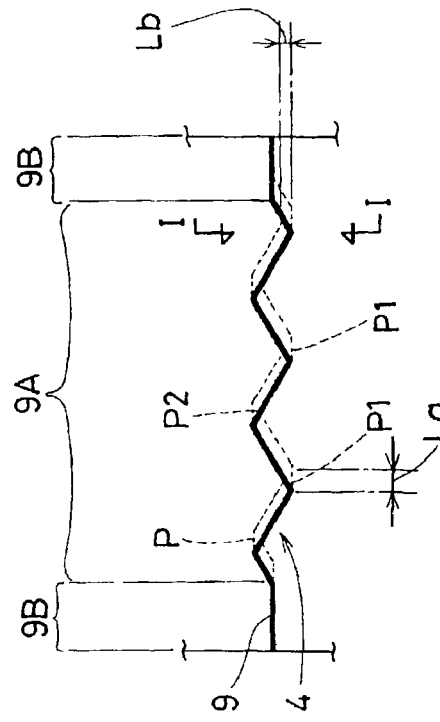
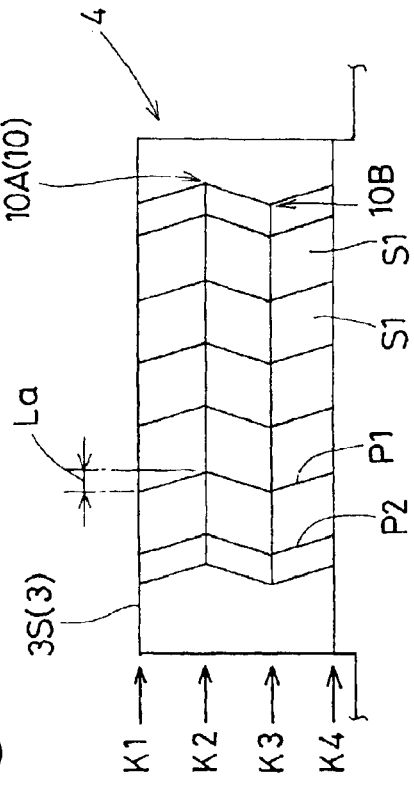
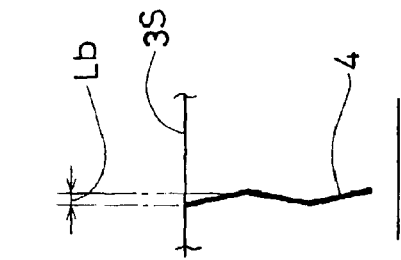
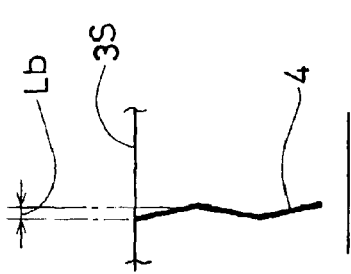
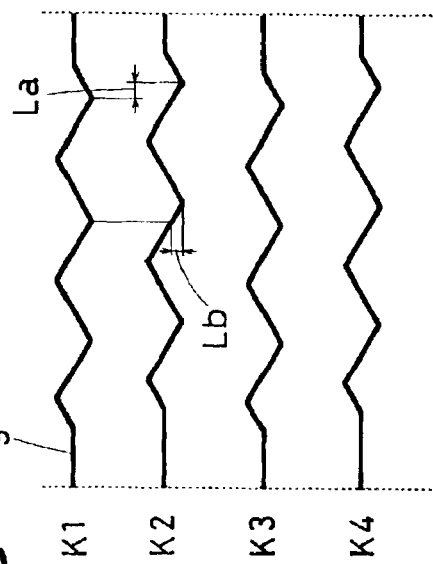

PNEUMATIC TIRE INCLUDING SIPES

This application claims priority under 35 U.S.C. §119 of Japanese application no. 2001-2 18490, filed Jul. 18, 2001.

BACKGROUND OF THE INVENTION

1. Field of the Invention

The present invention relates to a pneumatic tire provided in the tread portion with sipes, more particularly to an improved shape of a sipe being capable of preventing the siping blade of a tire vulcanizing mold from bending and coming off therefrom at the time of removing the vulcanized tire from the mold.

2. Description of the Related Art

In general, pneumatic tires such as snow tire and studless tire called winter tire are provided in the tread portion with a number of sipes to improve on-the-ice performance. Such performance may be improved by increasing the number of the sipes and/or the length of the sipes.

In recent years, on the other hand, in order to engage the side walls of a sipe with each other and thereby to give support to each other, the use of a sipe having three-dimensional side walls has been proposed.

In case of a sipe having three-dimensional side walls, however, when the vulcanized tire is removed from a tire mold, as the resistance becomes increased, there is a tendency for the siping blades to be deformed and come off from the mold. From a practical standpoint, therefore, it is difficult to increase the number and length of the sipes.

SUMMARY OF THE INVENTION

It is therefore, an object of the present invention to provide a pneumatic tire with sipes, in which the resistance to removing the vulcanized tire from a tire mold is reduced and the siping blades are prevented from being deformed and coming off from the mold although the sipe has three-dimensional side walls.

According to the present invention, a pneumatic tire comprises a tread portion, the tread portion comprising tread elements each provided with a sipe, the sipe having an open top end and a bottom, and in a range from the open top to a certain depth, a configuration of the sipe in a plane parallel with the tread face comprising a zigzag part, the zigzag part oscillating in the longitudinal direction of the sipe in the course from the open top to said certain depth.

BRIEF DESCRIPTION OF THE DRAWINGS

An embodiment of the present invention will now be described in detail in conjunction with the accompanying drawings.

FIG. 2 is a schematic top view of a zigzag sipe.

FIG. 3 is a schematic side view of a side wall of the zigzag sipe.

FIG. 4 is a schematic cross sectional view of the zigzag sipe taken along a line I—I of FIG. 2.

FIG. 5 is a diagram showing a change of the zigzag sipe's configuration in a plane parallel with the tread face.

DETAILED DESCRIPTION

Figure 1:
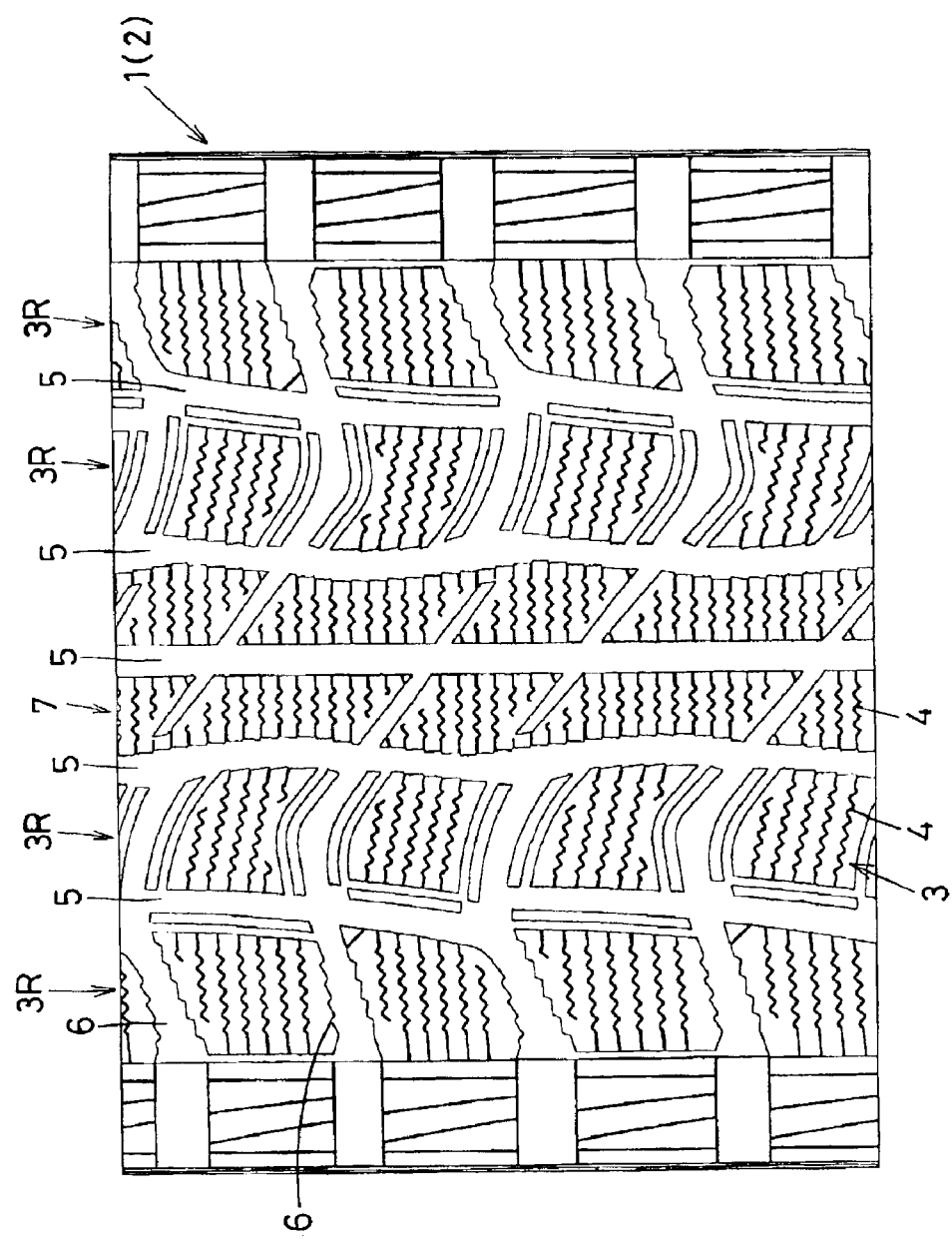
FIG. 1 shows a tread pattern for a pneumatic tire according to the present invention.

In the drawings, a pneumatic tire 1 according to the present invention comprises a tread portion 2 provided with tread grooves (5, 6) and thereby the tread portion 2 is divided into tread elements such as blocks 3 and ribs 7, and such tread elements are provided with sipes 4.

In this example, the tire 1 is a studless radial tire for passenger cars. FIG. 1 shows an example of the tread pattern therefor, wherein the tread portion 2 is provided with longitudinal main grooves 5 extending continuously in the tire circumferential direction and lateral main grooves 6, and thereby the tread portion 2 is divided into a rib 7 disposed on each side of the tire equator and two circumferential rows 3R of blocks 3 on the axially outside the rib 7. The lateral grooves which are provided on the ribs 7 are shallow and so the ribs 7 is regarded as having a continuity in the tire circumferential direction.

The sipes 4 are, in this embodiment, provided on the blocks 3 and ribs 7.

The sipe 4 has a zigzag configuration 9 at the tread face 3S. Here, the zigzag means both of a series of straight segments and a series of curved segments like a sine curve.

In case both of the ends E1 and E2 of a sipe are opened, the configuration 9 may be made up of two linear parts 9B extending straight from the open ends E1 and E2 and a zigzag part 9A therebetween. In case only one of the ends E1 and E2 is opened, the configuration 9 may be made up of a single linear part 9B extending from the open end and a zigzag part 9A. However, it is also possible that the sipe is made up of a zigzag part 9A only. Here, the linear part is substantially parallel with a straight line drawn between the ends E1 and E2. The zigzag part extends zigzag about the straight line. Thus, the configuration 9 is zigzagged at least in a central part.

In view of on-the-ice performance, it is preferable that each sipe 4 is on the whole inclined at an angle in a range of not more than 20 degrees with respect to the tire axial direction. In other words, the straight line drawn between the ends E1 and E2 is inclined at an angle in a range of not more than 20 degrees.

The configuration of the sipe 4 at the tread surface is as above. However, the configuration varies with the depth from the tread surface to a certain depth, usually to the bottom. Specifically, with respect to the configuration of the sipe 4 which appears in a plane parallel with the tread surface, the shape of the zigzag part 9A is the substantially same as that at the tread face from the tread surface to a certain depth (in this embodiment to the sipe bottom), but the zigzag part 9A oscillates in the longitudinal direction of the sipe in the course of depth from the tread surface to the certain depth.

Taking a sipe 4 consisting of a central zigzag part 9A and two linear parts 9B as an example, the configuration of the sipe 4 is explained below in detail in conjunction with FIGS. 2-5.

The zigzag part 9A in this example is made up of straight segments which are five long segments and two short segments at both ends. The two linear parts 9B extending from open ends E1 and E2 of the sipe 4 to the short zigzag segments.

The zigzag amplitude W of the zigzag part 9A is set in a range of from 1 to 10 mm, and the zigzag pitch Y in the longitudinal direction of the sipe is set in a range of from 0.6 to 10.0 times the amplitude W.

Figure 6:
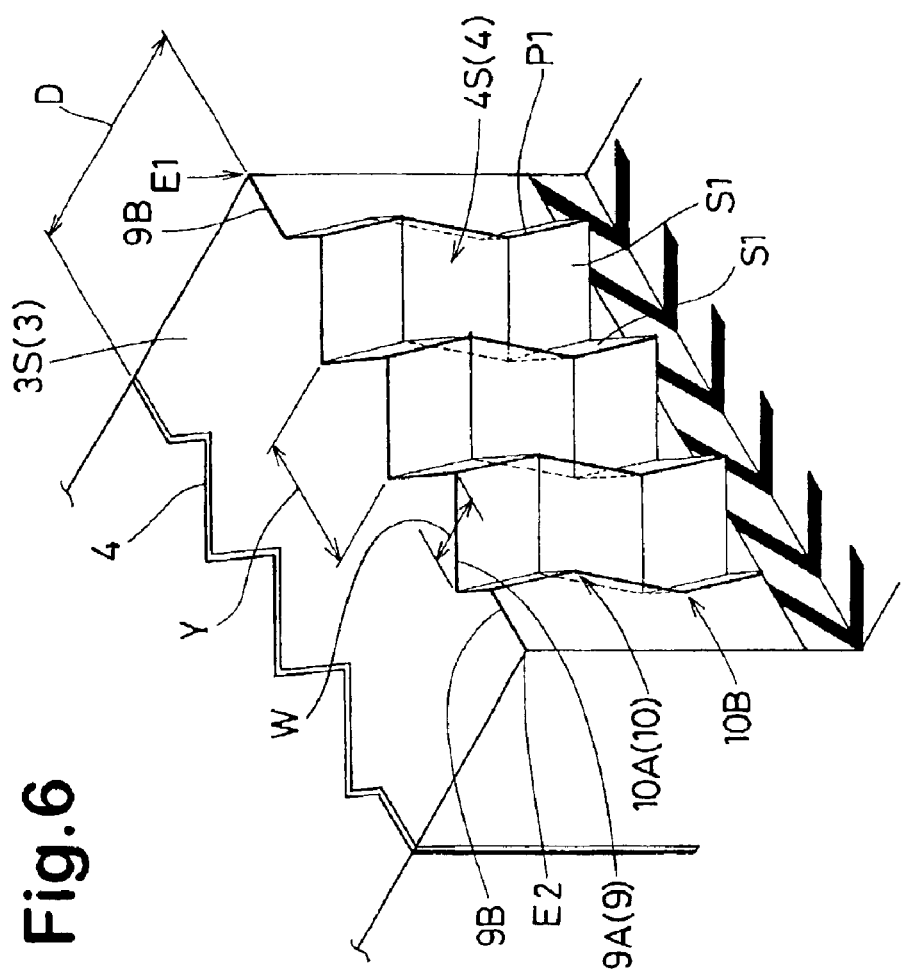
FIG. 6 is a perspective view showing the three-dimensional side wall of the zigzag sipe.

Here, the zigzag amplitude W is, as shown in FIG. 6, defined as the peak-to-peak amplitude of the zigzag of the side wall of the sipe 4. The zigzag pitch Y is the length of one cycle of the zigzag. In this example and usually, the zigzag amplitude W and the zigzag pitch Y in each sipe 4 are constant in the longitudinal direction of the sipe.

According to the present invention, the zigzag part 9A oscillates in the course of the sipe depth from the tread surface 3S to the sipe bottom. Specifically, in the course from a first depth K1 (the tread face 3S) to a second depth K2, the zigzag part 9A moves towards the end E1 (rightward in FIGS. 2 and 3). From the second depth K2 to a third depth K3, it moves towards the end E2 (leftward). From the third depth K3 to a fourth depth K4 (bottom), it again moves towards the end E2 (rightward).

The number of the turning points 10 (10A, 10B) at which the motion turns is at least 2 (or at least 1.5 cycles), preferably 3 or more (2 or more cycles) in order to obtain sufficient engagement of the side walls for preventing the block 3 from leaning excessively.

FIG. 5 shows the configurations 9 of the sipe 4 at the above-mentioned different depths K1, K2, K3 and K4. (K1<K2<K3<K4) As shown in this figure, the zigzag part 9A in this example makes reciprocating motion of 1.5 cycles while the lengths of the two linear portions 9B vary inversely. The trace lines (P1, P2) of the zigzag peak points P becomes parallel with each other in a range from the top to the bottom of the sipe 4 as shown in FIG. 3.

Further, the motion is not intermittently or continuous, and the motion is at a constant rate. Therefore, the trace lines (P1, P2) becomes linear.

The intervals for turning the motion, namely, the differences between the depths K1, K2, K3 and K4 are constant.

Further, the maximum shift La (shown FIGS. 2 and 3) in the longitudinal direction of the sipe is preferably set in a range of from 0.3 to 4.0 mm, more preferably 0.5 to 2.0 mm.

As a result, the sipe 4 has three-dimensional side walls 4S made up of parallelograms S1 as shown in FIG. 6 wherein the amplitude of the zigzag is somewhat exaggerated in comparison with FIGS. 2–5.

Although, it is not always necessary for all the sipes to have the same zigzag amplitude W, zigzag pitch Y, maximum shift La and intervals for turning the motion, it is preferable that the sipes 4 in one tread element such as block 5 are the same with respect to the zigzag amplitude W, zigzag pitch Y, maximum shift La, and intervals for turning the motion.

And the adjacent sipes 4 are arranged in parallel with each other so that the thickness of the rubber therebetween becomes substantially constant in the longitudinal direction and depth direction. Preferably, the intervals D between the sipes 4 in the tire circumferential direction is set in a range from 2 to 10 mm.

In this example, the sipes 4 include two types of sipes, namely, sipes whose both ends E1 and E2 are opened to the longitudinal main grooves S and sipes whose one end is opened to the longitudinal main groove 5 but the other end terminates in the tread element. There is no sipe whose both ends terminate in the tread element.

The above-mentioned sipes 4 are formed during vulcanizing the tire by using siping blades 21 disposed on the inner surface of a tire vulcanizing mold.

Figure 7:
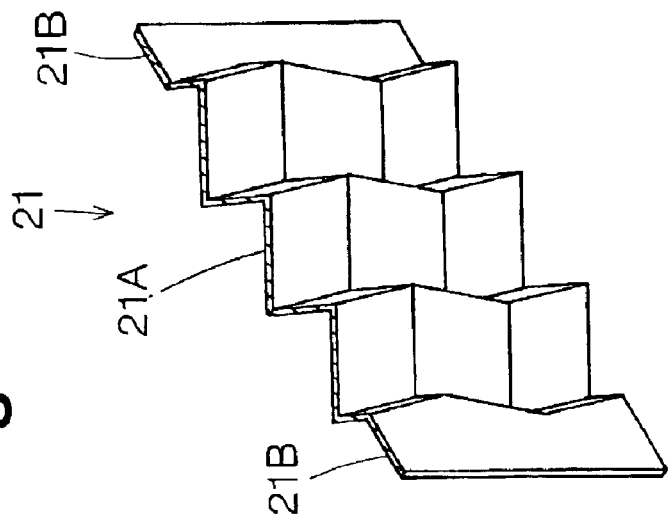
FIG. 7 is a perspective view of a siping blade for forming the zigzag sipe.

A siping blade 21 for forming the sipe 4 has a shape corresponding to that of the sipe 4. For example, FIG. 7 shows a siping blade 21 corresponding to the sipe 4 shown in FIG. 6. As the description of the sipe 4 may be applied to the blade 21, the detailed description is omitted here, but briefly the siping blade 21 has a zigzag part 21A and optional linear part(s) 21B. The zigzag part 21A oscillates in the longitudinal direction maintaining the substantially same shape.

Needless to say, the above-mentioned zigzag sipes 4 having three-dimensional side-walls can be used in a tire together with other sipes having two-dimensional side walls.

By constructing the sipe or siping blade as above, when the tread element provided with the sipe 4 is subjected to a force in a direction crosswise to the longitudinal direction of the sipe, the opposed side walls 4S of the sipe 4 are engaged with each other and the rubber parts on both sides of the sipe support each other to prevent the tread element from leaning excessively. As a result, on-the-ice performance can be greatly improved because the edges of the tread element function effectively and the rigidity of the tread element is improved. Further, noteworthy is that the siping blades 21 can be effectively prevented from being deformed and coming off from the mold at the time of removing the vulcanized tire from the mold.

Comparison Tests

Using tire vulcanizing molds provided with siping blades shown in FIG. 7 and the modified, pneumatic tires of size 195/65R15 (rim size 15×6JJ) for passenger cars were manufactured to obtain the rate of occurrence of damage on the siping blades. Further, the manufactured tires were tested for on-the-snow-and-ice performance. The specifications of the sipes (siping blades) are shown in Table 1.

1) Siping blade damage test:

After one thousand tires were molded, the number of the siping blades which were deformed or came off from the mold was counted and the number is listed in Table 1 using an index based on Ref. 1 being 100.

2) On-the-snow-and-ice performance test:

A 2000 cc FR passenger car provided on all the four wheels with the same kind of test tires (tire pressure 200 kPa) was run on a snowy road in a tire test course, and on-the-snow-and-ice performance was evaluated by the driver's feeling based on the steering responsiveness, steadiness, road grip and the like. The test results are indicated by an index based on Ref. 1 being 100, wherein the larger the index number, the better the performance.

TABLE 1

| Tire | Ref. 1 | Ref. 2 | Ref. 3 | Ex. 1 | Ex. 2 | Ex. 3 |
| --- | --- | --- | --- | --- | --- | --- |
| Tread pattern | FIG. 1 | FIG. 1 | FIG. 1 | FIG. 1 | FIG. 1 | FIG. 1 |
| Sipe | | | | | | |
| Top end configuration | FIG. 2 | FIG. 2 | FIG. 2 | FIG. 2 | FIG. 2 | FIG. 2 |
| Interval D (mm) | 3.5 | 2.7 | 2.3 | 3.5 | 3.5 | 3.5 |
| Total sipe number (Index) | 100 | 130 | 150 | 100 | 100 | 100 |
| Zigzag amplitude W (mm) | 2.0 | 2.0 | 2.0 | 2.0 | 2.0 | 2.0 |
| Zigzag pitch Y (mm) | 4.8 | 4.8 | 4.8 | 4.8 | 4.8 | 4.8 |
| Reciprocating motion | none | none | none | | | |
| Shift La (mm) | 0 | 0 | 0 | 1.0 | 0.5 | 2.0 |
| Number of turning points | 0 | 0 | 0 | 2 | 2 | 3 |
| Side walls of sipe | 2-D | 2-D | 2-D | 3-D FIG. 6 | 3-D FIG. 6 | 3-D FIG. 6 |
| Siping blade deformation | 100 | 80 | 70 | 95 | 100 | 90 |
| Snow/Ice performance | 100 | 105 | 100 | 120 | 115 | 125 |

What is claimed is:

1. A pneumatic tire comprising a tread portion, the tread portion comprising tread elements each provided with a sipe, the sipe having an open top end and a bottom, in a range from the open top to a certain depth, a configuration of the sipe in a plane parallel with the tread face comprising two linear parts and a central zigzag part, said linear parts being substantially parallel with a straight line drawn between the ends of the sipe, the zigzag part oscillating in the longitudinal direction of the sipe in the course from the open top to said certain depth so that the sipe has side walls each made up of parallelograms, and a maximum shift (La) of the zigzag part in a longitudinal direction is in a range of from 0.5 to 2.0 mm.

2. The pneumatic tire according to claim 1, wherein the zigzag part is made up of substantially straight segments.

3. The pneumatic tire according to claim 1 or 2, wherein the zigzag part oscillates at least 1.5 cycles.

4. The pneumatic tire according to claim 1, wherein said tread elements include blocks each provided with a plurality of the sipes which are arranged at intervals of from 2 to 10 mm in a tire circumferential direction so that a straight line drawn between the ends of each sipe is inclined at an angle in a range of not more than 20 degrees with respect to a tire axial direction.

5. The pneumatic tire according to claim 1, wherein said tread elements include a rib provided with a plurality of the sipes which are arranged at intervals of from 2 to 10 mm in a tire circumferential direction so that a straight line drawn between the ends of each sipe is inclined at an angle in a range of not more than 20 degrees with respect to a tire axial direction.

6. The pneumatic tire according to claim 1, wherein said tread elements include:

a rib provided with a plurality of the sipes which are arranged at intervals of from 2 to 10 mm in a tire circumferential direction so that a straight line drawn between the ends of each sipe is inclined at an angle in a range of not more than 20 degrees with respect to a tire axial direction; and blocks each provided with a plurality of the sipes which are arranged at intervals of from 2 to 10 mm in the tire circumferential direction so that a straight line drawn between the ends of each sipe is inclined at an angle in a range of not more than 20 degrees with respect to the tire axial direction.

7. The pneumatic tire according to claim 1, wherein the zigzag part has a peak-to-peak amplitude W of from 1 to 10 mm, and a zigzag pitch of from 0.6 to 10.0 times the amplitude W.

8. The pneumatic tire according to claim 7, wherein the zigzag part oscillates from the tread face to the sipe bottom.

9. The pneumatic tire according to claim 8, wherein the oscillation from the tread face to the sipe bottom is at least 1.5 cycles.

10. The pneumatic tire according to claim 8, wherein the oscillation from the tread face to the sipe bottom is at least 2 cycles.

* * * * *